United States Patent [19]

Jensen et al.

[11] 4,375,490

[45] Mar. 1, 1983

[54] PHOTOGRAPHIC FILM SPLICE

[75] Inventors: Gerald A. Jensen, Plymouth; Ted G. Merry, Lindstrom, both of Minn.

[73] Assignee: Pako Corporation, Minneapolis, Minn.

[21] Appl. No.: 321,765

[22] Filed: Nov. 16, 1981

Related U.S. Application Data

[62] Division of Ser. No. 207,453, Nov. 17, 1980, abandoned.

[51] Int. Cl.³ .................................................. B32B 3/10

[52] U.S. Cl. ...................................... 428/60; 156/157; 156/196; 156/304.6; 156/506; 428/58

[58] Field of Search ............... 156/157, 581, 500, 196, 156/506, 304.5, 304.6; 428/60, 58

[56] References Cited

U.S. PATENT DOCUMENTS

| | | | |
|---|---|---|---|
| 3,047,053 | 7/1962 | Howard | 156/581 |
| 3,331,719 | 7/1967 | Soloff | 156/157 |
| 3,486,964 | 12/1969 | Brunlid | 156/157 |
| 3,725,168 | 4/1973 | Rosborough, Jr. et al. | 156/157 |
| 3,769,140 | 10/1973 | Sayer | 156/502 |
| 3,769,141 | 10/1973 | Haugen et al. | 156/504 |
| 3,814,656 | 6/1974 | Hanson et al. | 156/581 |
| 3,904,474 | 9/1975 | Wasco et al. | 156/581 |
| 3,914,491 | 10/1975 | Takahashi | 428/137 |
| 3,972,762 | 8/1976 | Kawahara et al. | 156/196 |
| 3,996,403 | 12/1976 | Gould et al. | 428/60 |
| 4,114,349 | 9/1978 | Jensen et al. | 53/54 |
| 4,135,957 | 1/1979 | Voller | 156/581 |
| 4,139,978 | 2/1979 | Jensen et al. | 53/167 |
| 4,139,980 | 2/1979 | Larson et al. | 53/520 |

*Primary Examiner*—Jerome W. Massie

*Attorney, Agent, or Firm*—Kinney, Lange, Braddock, Westman and Fairbairn

[57] ABSTRACT

A photographic film splicer includes a supporting pad or platform on which ends of photographic film strips are supported, and a movable heat block which applies heat and pressure to a heat activated splice tape and the film ends. A heated die attached to the heat block and a plurality of spring-loaded pins supported by the platform apply heat and pressure to a portion of one of the film ends proximate the splice tape to deform a portion of the film strip. The deformed area of the film strip acts as a ramp proximate the splice tape which guides film strips over the interface of the splice tape and the film strip during operations in which the web of photographic film is cut into individual lengths and in which the individual lengths of film are stacked.

3 Claims, 7 Drawing Figures

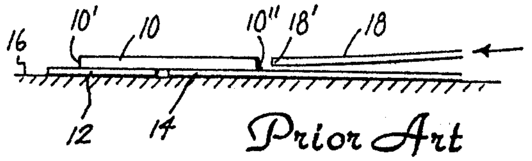
Fig. 1
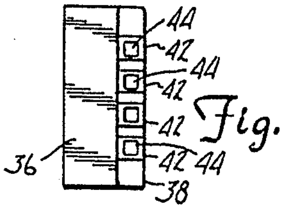
Fig. 6
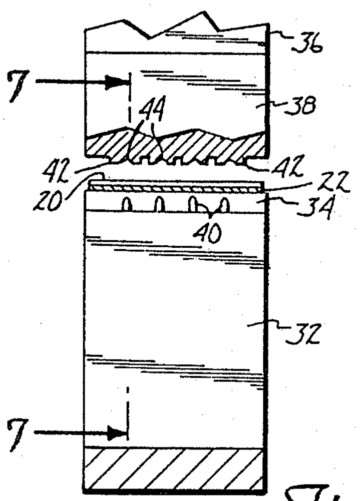
Fig. 5
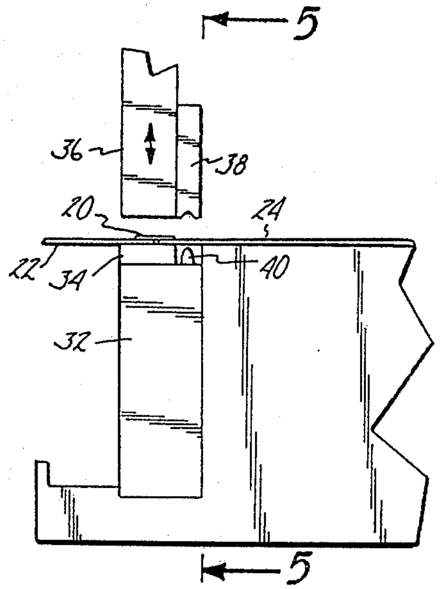
Fig. 4
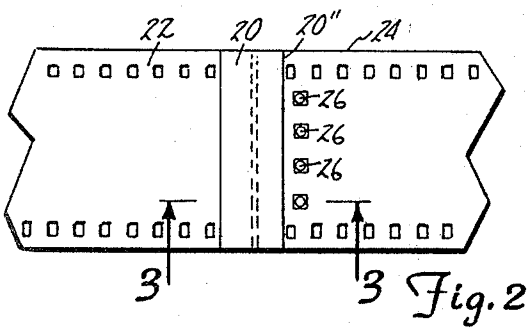
Fig. 2
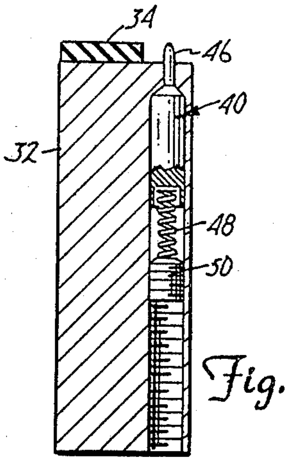
Fig. 7
Fig. 3
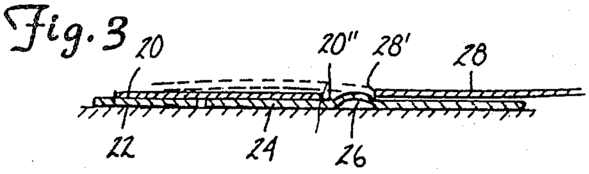

PHOTOGRAPHIC FILM SPLICE

This is a division of application Ser. No. 207,453, filed Nov. 17, 1980, now abandoned.

BACKGROUND OF THE INVENTION

1. Field of the Invention

The present invention relates generally to photographic processing equipment. In particular, the present invention is an improvement to photographic film splicers to prevent problems caused by splice tape during subsequent processing operations.

2. Description of the Prior Art

In commercial photographic processing operations, very high rates of processing must be achieved and maintained in order to operate profitably. For that reason, many rolls (or strips) of photographic film from various customers are typically spliced together for processing and printing purposes. After prints have been made from the photographic film, an individual customer's film must be separated from the long web of film formed by the spliced-together film strips. Typically the customer's film is cut into segments of several frames each so that the segments can be placed flat in an envelope together with the customer's prints.

One typical type of splicer used in photographic processing operations uses heat activated splice tape which is applied under heat and pressure to the ends of the film strip to be spliced. The film splicer includes a splice pad or platform which supports the ends of the film to be spliced, and a movable heat block or head which applies heat and pressure to the splice tape and the film ends in order to bond the splice tape to the ends of the film.

In the past, equipment has been developed to eliminate many of the manual operations required for handling photographic film in a commercial photographic processing operation. This equipment has included automatic film cutters, which cut the film into segments of several frames each. Typically the cut film segments are stacked in a tray until all of the segments from a customer's order have been stacked, and then are manually removed from the tray and placed in an envelope.

The packaging of the photographic film segments has been even further automated in apparatus known as the Pako Photopacker, which is manufactured by Pako Corporation, the assignee of the present application. The Pako Photopacker automates film cutting, print paper cutting, print sorting, and packaging of both film segments and prints. U.S. Pat. No. 4,114,349 by G. A. Jensen, L. A. Larson and R. E. Diesch; U.S. Pat. No. 4,139,978 by G. A. Jensen and A. J. Willenbring; and U.S. Pat. No. 4,139,980 by L. A. Larson and R. E. Diesch; and copending U.S. patent application Ser. No. 146,508 by A. W. Willenbring, W. J. Osby and G. R. Strunc, and Ser. No. 146,507 by P. J. Gilligan and T. G. Merry (both of which are assigned to the assignee of the present application) illustrate portions of mechanisms which have been used in the Pako Photopacker. One form of the film cutting, conveying and packing mechanism is illustrated in FIG. 3 of U.S. Pat. No. 4,139,978 and is described in further detail in U.S. Pat. No. 4,139,980. Another form of the film cutting, conveying and packing mechanism is illustrated in the two abovementioned copending patent applications.

In the Pako Photopacker, a multilayer packaging strip is transported along a transversely inclined conveyor bed. The individual layers of the multilayer packaging strip are separated from one another as the strip passes a film and print insertion station. The packaging strip is stopped at the film and print insertion station, and film segments are power driven by a film inserting mechanism into an opening between the separated layers of the packaging strip. Similarly, the photographic prints are inserted into another opening created between other separated layers of the packaging strip. After the film and prints have been inserted, the packaging strip is advanced along the conveyor bed to other stations, at which the sides of envelopes to be formed from the continuous multilayer packaging strip are sealed. An envelope side cutting assembly is positioned downstream of the side sealing apparatus, and cuts the sides of the envelopes along transverse separation lines. An envelope top sealing apparatus is also provided to seal the top of the envelope. The Pako Photopacker, therefore, provides sealed envelopes containing the customer's prints, the film segments from which those prints were made, and in some cases advertising materials or the like.

In both the semi-automated systems in which photographic film is cut and stacked on a tray and the manually inserted in an envelope, and in automated systems such as the Pako Photopacker, it is important to avoid conditions in which the film segments can jam the apparatus or otherwise become damaged. In most cases, damaged photographic film frames cannot be repaired or replaced.

SUMMARY OF THE INVENTION

The present invention recognizes that the presence of film splice tape presents the possibility of jamming of automatic equipment or damage to photographic film segments during the cutting of the film into segments, the stacking of the segments, and/or the automatic packaging of the segments. In particular, problems can be encountered when the edge of the splice tape catches on the edge of another cut film segment (or vice versa). This can occur, for example, when a previously stacked segment contains a splice, and a subsequent cut segment is stacked on top of the previous segment. If the leading edge of the subsequent segment catches on the trailing edge of the splice, the subsequent segment may not be properly stacked, thus causing jamming of the stacking apparatus, or improper stacking of all subsequent segments.

In the present invention, potential problems of this type caused by film splice tape is substantially eliminated. A film strip is deformed proximate an edge of the splice tape to provide a ramp. This ram guides other film segments over the edge of the splice tape.

In a preferred embodiment of the present invention, the ramp is produced at the time that the film splice is made by a photographic film splicer. An improved photographic film splicer includes means for deforming the film strip proximate the splice tape to provide the ramp. The photographic film splicer is preferably of the type having a platform for supporting ends of two film strips, means for supplying heat activated splice tape over the ends of the two film strips, and a heat block or head which applies heat and pressure to the tape and the film ends. In this embodiment, the means for deforming the film strip include a heated die mounted to and movable with the heat block, and a plurality of pins positioned on an opposite side of the film from the die. When the heat block is brought into engagement with the heat activated splice tape, the die and pins engage the film to heat and deform the film proximate the splice tape. The pins and die create a plurality of dimples which act as the ramp proximate an edge of the splice tape.

BRIEF DESCRIPTION OF THE DRAWINGS

FIG. 1 illustrates a problem which can be encountered with prior art photographic film splices when stacking cut photographic film segments.

FIGS. 2 and 3 are top and cross-sectional views of spliced photographic films with dimples forming a ramp proximate an edge of a photographic film splice.

FIG. 4 is a side view of a portion of a photographic film splicer utilizing the present invention.

FIG. 5 is a sectional view along section 5—5 of FIG. 4.

FIG. 6 is a bottom view of a heat block and dimple die of the apparatus of FIGS. 4 and 5.

FIG. 7 is a sectional view along section 7—7 of FIG. 5.

DETAILED DESCRIPTION OF THE PREFERRED EMBODIMENTS

As shown in FIG. 1, a problem can be encountered with prior art film splices when stacking segments of photographic film. Splice tape 10 connects film segments 12 and 14. Segment 12 consists of a short stub of photographic film, since the remainder of the strip to which film segment 12 has been connected has been severed. Segment 14 is longer than film stub 12, and typically contains three or four frames of photographic images. A film segment like that shown in FIG. 1 is produced when film is fed through a photographic film cutter in a "last frame first" manner, in which the last frame of each strip passes the knife assembly of the film cutter first. In this type of cutting, the last cut made in any strip is right in front of leading edge 10′ of splice 10, so that a short stub 12 and splice 10 are left attached to front end of the next film segment 14.

As shown in FIG. 1, the segment containing strips 12 and 14 and splice tape 10 is supported on a tray or platform 16 of a typical film stacking or packaging device. A problem can occur when another film segment 18 is advanced to be stacked on top of the previous segment containing splice 10. In some cases, leading edge 18′ of segment 18 can engage trailing edge 10″ of splice 10. Segment 18, therefore, is not stacked properly on top of previous segments 12–14 and the trailing edge of segment 18 will protrude too far. This can create serious problems in operation, particularly in the case of automatic film packaging equipment such as the Pako Photopacker. If any of the film segments is not securely and properly stacked, it may protrude out and hang up on the film inserting apparatus as the packaging strip is advanced away from the film insertion and print insertion station. In this case, the improperly stacked film segment can tip, which in turn can create problems in sealing the packages and in some cases can result in the film being damaged. Similar problems can be encountered with other film stacking apparatus, in which the film is stacked on a tray, and is removed manually for insertion into a package. An improperly stacked film segment may cause jamming of the film cutter apparatus or the film stacking apparatus. In any case, it requires special attention from the operator in order to stack the film segments properly prior to insertion into a package. This results in time-consuming steps by the operator, and thus reduces efficiency of the film cutting and packaging operations.

The present invention, as illustrated in FIGS. 2 and 3, overcomes the problems encountered in the prior art in stacking or packaging cut film segments containing a splice. FIG. 2 is a top view showing a splice 20 joining strips 22 and 24 of photographic film. Proximate one edge of splice 20 are a plurality of small bumps or dimples, which act as a ramp proximate trailing edge 20″ of splice 20. As illustrated in FIG. 3, when stacking of film segments is being performed with a film segment 28 being stacked on top of segments 22–24 containing splice 20, dimples 26 act as a ramp to guide leading edge 28′ of segment 28 over trailing edge 20″ of splice 20. Dimples 26 are of sufficient height and are positioned with respect to trailing edge 20″ of splice 20 so that leading edge 28′ of segment 28 is guided over edge 20″ and onto the top surface of splice 20 without interference.

FIGS. 4–7 illustrate a preferred embodiment of apparatus for forming ramp dimples 26. The apparatus illustrated in FIGS. 4–7 forms a part of a photographic film splicer, such as a Pako Model 1350 Splicer. The apparatus shown in FIG. 4–7 includes film track 30, punch block 32, resilient rubber pad 34, heat block 36, dimpler die 38, and spring loaded pins 40. As shown in FIG. 4, film strip 24 is supported on film track 30. The ends of film strips 22 and 24 are supported on rubber pad 34, and splice tape 20, which is a heat activated splice tape, is placed over the ends of strips 22 and 24. To bond splice tape 20 to the ends of strips 22 and 24, heat block 36 is moved downward so that it applies heat and pressure to tape 20 and the ends of strips 22 and 24.

Dimples 26 are formed proximate an edge of splice tape 20 by dimple die 38 and spring loaded pins 40. Dimple die 38 is preferably metal, and is in heat conducting relationship with heat block 38. In a preferred embodiment shown in FIGS. 4–6, dimple die 38 has four lands 42 at its lower surface. Each land 42 contains a square shaped indentation or depression 44 in its lower surface. Indentations 44 are aligned with corresponding pins 40 mounted in punch block 32. As shown in FIG. 7, each pin 40 has an upper end 46 which extends above the upper surface of punch block 32. Each pin 40 is spring biased in an upward direction by spring 48. The spring force applied by spring 48 is adjustable by means of adjustment screw 50.

As heat block 36 moves downward to apply heat and pressure to splice 20 and the ends of strips 22 and 24, dimpler die 38 and pins 40 engage strip 24. The heat applied by lands 42 of dimpler die 38 causes the film 24 to be heated to a temperature at which it is deformed by the upward pressure of pins 46 and the downward pressure of dimpler die 38. The compressibility of rubber pad 34 and the spring mounting of pins 40 permits the upper ends 46 of pins 40 to force the heated film 24 into indentations 44 of dimpler die 38.

The resulting dimples 26 effectively form a ramp to permit stacking of film strips without interference by splice 20. In a preferred embodiment, four dimples 26, as illustrated in FIG. 2, are used. It will be understood, however, that the shape, dimensions, and number of dimples can be varied.

It has been found that use of lands 42 is particularly desirable, since it reduces the area where heat is being applied to film strip 24 to only those areas where pins 40 engage film 24. It is important to limit the amount of heat applied to only that needed to create dimples 26, so that film 24 does not deform in an uncontrollable manner.

The use of spring loaded pins 40 in the apparatus of the present invention is particularly advantageous, since it causes pins 40 to provide only a controllable amount of upward force to the heated portions of film 24. If pins 40 are not spring loaded, there is a danger of pins 40 poking a hole through film 24, rather than merely creating dimples 26. Springs 48 and adjustment screws 50 permit adjustment of the spring force to ensure that pins 40 merely deform and do not puncture film 24.

In conclusion, the present invention provides a simple, yet effective solution to the problem of stacking photographic film segments when one of the segments contains a splice. The formation of dimples 26 to produce a ramp proximate an edge of splice tape 20 is achieved with a minimum of additional components, and is easily incorporated into existing film splicing equipment which uses heat activated splice tape.

Although the present invention has been described with reference to preferred embodiments, workers skilled in the art will recognize that changes may be made in form and detail without departing from the spirit and scope of the invention.

What is claimed is:

1. In combination:
   - a first strip of photographic film having a top and bottom surface;
   - a second strip of photographic film having a top and bottom surface;
   - a splice tape bonded to the top surfaces of adjacent ends of the first and second strips to splice the first and second strips together with their ends in abutting relationship, the splice tape defining a raised spliced area on the adjacent film strip ends wherein the spliced area has a top surface which is above the top surfaces of the first and second film strip and has an edge generally transverse to a longitudinal axis of the first and second film strips and forms a discontinuity between the top surface of the first film strip and the top surface of the splice tape; and
   - a ramp positioned on and extending above the top surface of the film strip proximate the edge of the splice tape outside of the spliced area, the ramp having an inclined portion positioned on a side of the ramp away from the edge of the splice tape.

2. The invention of claim 1 wherein the ramp comprises a deformed portion of the second strip proximate an edge of the splice tape.

3. The invention of claim 2 wherein the deformed portion comprises a plurality of dimples in the second strip proximate the edge of the splice tape.

* * * * *